United States Patent
Jenaro Rabadan et al.

(10) Patent No.: US 8,255,174 B2
(45) Date of Patent: Aug. 28, 2012

(54) METHOD AND DEVICE FOR DETERMINING CRITICAL BUFFETING LOADS ON A STRUCTURE OF AN AIRCRAFT

(75) Inventors: Guillermo Jenaro Rabadan, Toulouse (FR); Juliane Havas, Colomiers (FR); Stéphane Soumillon, Fontenilles (FR); Carole Despre-Flachard, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 350 days.

(21) Appl. No.: 12/789,309

(22) Filed: May 27, 2010

(65) Prior Publication Data

US 2010/0312497 A1 Dec. 9, 2010

(30) Foreign Application Priority Data

Jun. 3, 2009 (FR) .................................... 09 02667

(51) Int. Cl.
*G01L 1/00* (2006.01)

(52) U.S. Cl. .................. 702/42; 702/34; 702/41; 703/1; 703/8; 73/861.42; 73/769; 73/786; 73/763; 701/9; 701/14; 701/16; 701/124; 244/117 R; 244/76 C; 244/91; 340/945; 340/960; 340/963; 340/666

(58) Field of Classification Search ............ 702/34, 702/41, 42; 703/1, 8; 73/180, 861.42, 861.47, 73/702, 802, 865.8, 769, 786, 763; 701/8, 701/3, 14, 124, 9, 16, 116; 244/195, 117 R, 244/76 R, 76 C, 213, 91, 121, 125, 127, 30, 244/25; 340/945, 946, 951, 500, 960, 948, 340/963, 971, 666

See application file for complete search history.

(56) References Cited

U.S. PATENT DOCUMENTS

| | | | | |
|---|---|---|---|---|
| 3,686,936 | A | * | 8/1972 | Daudt, Jr. .......................... 73/180 |
| 4,052,025 | A | * | 10/1977 | Clark et al. ...................... 244/25 |
| 4,164,149 | A | * | 8/1979 | Okubo ............................. 73/594 |
| 4,188,823 | A | * | 2/1980 | Hood ............................... 73/147 |
| 4,268,979 | A | * | 5/1981 | Minnich ........................ 434/46 |
| 4,480,480 | A | * | 11/1984 | Scott et al. ...................... 73/769 |
| 4,706,902 | A | * | 11/1987 | Destuynder et al. ........ 244/76 C |
| 5,549,260 | A | * | 8/1996 | Reed, III ........................ 244/195 |
| 5,639,964 | A | * | 6/1997 | Djorup ........................ 73/170.12 |
| 6,752,020 | B1 | * | 6/2004 | Sobotta et al. .................. 73/702 |
| 7,271,741 | B2 | * | 9/2007 | Delaplace et al. ............ 340/945 |
| 7,382,283 | B2 | * | 6/2008 | Delaplace et al. ............ 340/945 |
| 7,589,645 | B2 | * | 9/2009 | Schmidt ........................ 340/960 |
| 7,767,944 | B2 | * | 8/2010 | Facciano et al. ............... 244/3.1 |
| 8,010,243 | B2 | * | 8/2011 | Livet ................................ 701/8 |
| 8,049,148 | B2 | * | 11/2011 | Facciano et al. ............... 244/3.1 |
| 8,155,803 | B2 | * | 4/2012 | Ferro ............................... 701/7 |
| 2007/0136030 | A1 | * | 6/2007 | Delaplace et al. ................ 703/1 |
| 2008/0097728 | A1 | * | 4/2008 | Delaplace et al. ................ 703/1 |

OTHER PUBLICATIONS

"Predicting Unsteady Aeroelastic Behavior," NTIS Tech Notes, US Dept. of Commerce, Springfield, VA, U.S., Jan. 1, 1991, pp. 106.

* cited by examiner

*Primary Examiner* — Carol Tsai

(74) *Attorney, Agent, or Firm* — Novak Druce + Quigg LLP

(57) ABSTRACT

A method and device for determining critical buffeting loads on a structure of an aircraft is disclosed. The device (1) comprises means (2, UC) implementing a semi-empirical method for determining the critical loads generated by some buffeting on the structure of the airplane.

10 Claims, 2 Drawing Sheets

METHOD AND DEVICE FOR DETERMINING CRITICAL BUFFETING LOADS ON A STRUCTURE OF AN AIRCRAFT

CROSS-REFERENCE TO RELATED APPLICATIONS

This application claims priority to French Patent Application 0902667, filed Jun. 3, 2009, the contents of which are incorporated herein by reference.

FIELD OF THE INVENTION

The present invention relates to a method and a device for determining the critical loads caused by a buffeting structure of an airplane, more particularly of a transport airplane.

BACKGROUND OF THE INVENTION

It is known that <<buffeting>> is an aerodynamic phenomenon occurring in the non linear field of the flight envelope where unstable phenomena occur, such as burble, shocks, or the interactions thereof. Such phenomena influence the forces acting on the airplane, so as to generate vibrations representing said buffeting. Such vibrations can act on the whole airplane or only on a particular structure (such an elevator unit for instance) of the latter resulting in a risk for the airplane. In particular, buffeting could generate fatigue and damage to the structure it is generated on, as well as discomfort for the passengers of the airplane.

Consequently, as the buffeting phenomenon generates important drawbacks, it would be interesting and very useful to have available a reliable prediction of the stresses likely to be exerted by such a buffeting on a particular structure of an airplane, such as an aerofoil, in particular for taking it into consideration upon designing an airplane. Such a prediction could also be used for making the pilot of the airplane aware of flight conditions for which some buffeting occurs, so that it could take the necessary action in order to avoid them during a flight.

SUMMARY OF THE INVENTION

The present invention relates to a method useful to determine the critical loads caused by some buffeting on a structure, more particularly on an aerofoil, such an elevator unit, of an airplane, and including a transport airplane.

To this end, according to this invention, said method is characterized in that:
a) trials are conducted in a blowing unit on an airplane model, said trials comprising steps consisting in:
  simulating conditions for which some burble occurs on at least one part of a surface of the airplane; and
  carrying out, for such conditions, measurements using stationary pressure sensors, instationary pressure sensors and accelerometers arranged on said model;
b) with at least some of such measurements, the flow burble areas are determined on said structure of the airplane;
c) an aerodynamic modelling is implemented for determining, using the measurements from steps a), in the burble areas as determined from step b), a pressure field resulting in the structure buffeting;
d) the thus determined pressure field is integrated so as to obtain the overall stresses and moments generated by the buffeting;
e) using such overall stresses and moments, the stresses are calculated that the structure is to bear, such stresses comprising aerodynamic stresses caused by buffeting, induced aerodynamic stresses, inertia stresses and damping stresses; and
f) the critical loads due to buffeting are determined using the stresses as calculated in step e).

Thus, according to this invention, the critical loads being generated by some buffeting on a structure, are able to be determined, mainly on an aerofoil (such as, more specifically, an elevator unit) of an airplane, in particular of a transport airplane, in a particularly reliable and accurate way, using a semi-empirical method based on trials conducted in a blowing unit.

According to this invention, as described herein after, in order to determine the critical loads, there is taken into consideration the fact that the aerodynamic instationary stresses in buffeting conditions both comprise stresses generated by the natural flow instability (existing in the absence of movements of the structure being considered) and stresses induced by the movements of the structure.

Advantageously, in step b), flow burble areas are determined, also using data obtained from such simulations, preferably of the CFD (<<Computational Fluid Dynamics>>) type.

In addition, advantageously, in step c), additional instationary pressure signals are determined, using an interpolated amplitude of pressure signals as obtained in step a), and a cross-correlated random phase. Preferably:
  said additional instationary pressure signals are determined using analytical functions illustrating space correlations between the different signals; and/or
  said additional instationary pressure signals are defined at the intersections of a predetermined grid being associated to said structure.

Moreover, advantageously, in step c), the additional instationary pressure signals are converted from conditions relating to the blowing trials into (real) flight conditions.

Additionally, advantageously:
  in step d), first of all the pressure field is integrated according to the chord of said structure, then the result being obtained is integrated according to the span of the structure, so as to obtain said overall stresses and moments; and/or
  in step e), a model of finished elements and an aerodynamic model are used, taking into consideration the effects of the aerodynamics as induced by the structure vibration.

Moreover, in order to determine the critical loads generated by some buffeting on a structure corresponding to an elevator unit of an airplane, in step f):
  the same excitation is applied on the right and on the left of the airplane;
  a scan is implemented with a constant shift phase; and
  a time delay is introduced into the signals.

The present invention further relates to a device for determining critical loads generated by some buffeting on a structure, more particularly, an aerofoil such as an elevator unit, of an airplane and more specifically, a transport airplane.

According to this invention, said device is characterized in that it comprises:
  first means for conducting trials in a blowing unit on a model of an airplane, said trials comprising simulating conditions for which some burble occurs on at least one part of a surface of the airplane, and carrying out, for such conditions, measurements using stationary pressure sensors, instationary pressure sensors and accelerometers being arranged on said model;

second means for determining, using at least some of such measurements, flow burble areas on said structure of the airplane;

third means for carrying out an aerodynamic modeling so as to determine, using the measurements as implemented during trials in a blowing unit, in burble areas as determined by said second means, a pressure field, generating some buffeting of the structure;

fourth means for integrating the thus determined pressure field so as to obtain the overall stresses and moments generated by the buffeting;

fifth means for calculating, by means of such overall stresses and moments, the stresses the structure is to bear, such stresses comprising aerodynamic stresses generated by buffeting, induced aerodynamic stresses, inertia stresses and damping stresses; and sixth means for determining the critical loads generated by buffeting using the stresses as calculated by said fifth means.

BRIEF DESCRIPTION OF THE DRAWINGS

The figures of the appended drawing will better explain how this invention can be implemented. In these figures like reference numerals relate to like components.

DETAILED DESCRIPTION

Figure 1:
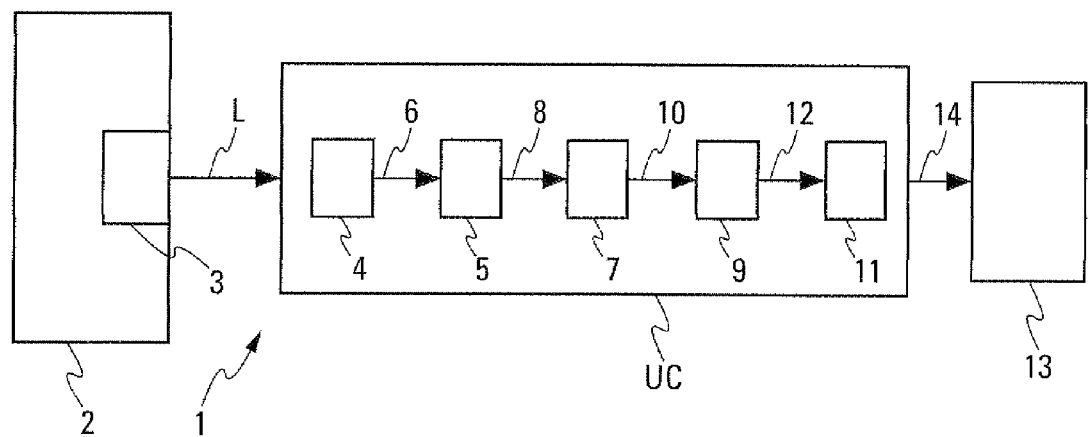
FIG. 1 is the block diagram of a device according to this invention.

The device 1 according to this invention and schematically shown on FIG. 1 is intended to determine critical loads being generated by some buffeting on a particular structure S of an airplane A, in particular on an elevator unit or on another aerofoil of the airplane A.

According to this invention, said device 1 comprises usual means 2 for conducting trials in a blowing unit on a model of the airplane being considered. Such means 2 comprise all the usual elements allowing for conditions to be created that are required to be simulated and to implement the necessary measurements. Such means 2 comprise, more specifically, stationary pressure sensors, instationary pressure sensors and accelerometers being arranged on the model to be used for the trials, at the level of the structure S being considered.

According to this invention, during such trials, conditions are simulated, for which some burble is generated on at least one part of a surface of the airplane A and, then, measurements are implemented by means of said sensors and said accelerometers. Such measurements can be recorded and stored on a usual storing means 3, in order to be able to be restored upon processing results obtained during trials in a blowing unit.

The device 1 further comprises a calculation unit UC able to receive the information as stored in said storing means 3, as illustrated by a link L on FIG. 1. Such a calculation unit UC comprises:

means 4 for determining, using at least some of the measurements carried out during trials, flow burble areas on said structure S of the airplane A;

means 5 being connected via a link 6 to said means 4 and being arranged so as to carry out an aerodynamic modeling in order to determine, using the measurements carried out during trials in a blowing unit, in the burble areas as determined by said means 4, a pressure field generating some buffeting on the structure S;

means 7 being connected via a link 8 to said means 5 and being arranged so as to integrate the pressure field as determined by said means 5, in order to obtain overall stresses and moments generated by buffeting;

means 9 being connected via a link 10 to said means 7 and being arranged so as to calculate, using such overall stresses and moments, the stresses that the structure S is to bear. Such stresses comprise aerodynamic stresses generated by buffeting, induced aerodynamic stresses, inertia stresses and damping stresses, as described herein after; and means 11 being connected via a link 12 to said means 9 and being arranged so as to determine critical loads generated by buffeting using the stresses as calculated by said means 9.

The device 1 can also comprise means 13, for example display or printing means, being connected via a link 14 to said calculation unit UC and adapted for presenting to an operator (more particularly on a screen on a paper medium) the results as obtained according to the present invention.

Such results (thus indicating the critical loads generated by some buffeting on the structure S to be considered of the airplane A) could be more specifically used by airplane designers for taking them into consideration when designing a structure S and/or an airplane A. Such results could also be used for making the pilot of the airplane A aware of the flight conditions for which buffeting occurs, so that he can take the necessary steps for preventing such conditions from occurring during a flight.

The device 1 according to this invention is thus able to determine, in a particular reliable and accurate way, using a semi-empirical method (herein after described) being based on trials conducted in a blowing unit, the critical loads being generated by some buffeting on a structure 5, essentially, an aerofoil (such as, more specifically, an elevator unit) of an airplane A, in particular a transport airplane.

According to this invention, as noticed herein after, for determining the critical loads, the device 1 takes into consideration the fact the instationary aerodynamic stresses in a buffeting condition both comprise the stresses caused by the natural flow instability (existing in the absence of movements of the structure S being considered) and the stresses induced by the movements of the structure S.

The means 4 determine the size and the position of the burble on the structure S, using the stationary pressure measurements and the instationary pressure measurements. In a particular embodiment, said means 4 use for determining the flow burble areas on the structure being considered (i.e. the areas where the flow is separated), in addition to measurements carried out during trials, data as obtained by means of simulations, preferably of the CFD type.

Figure 2:
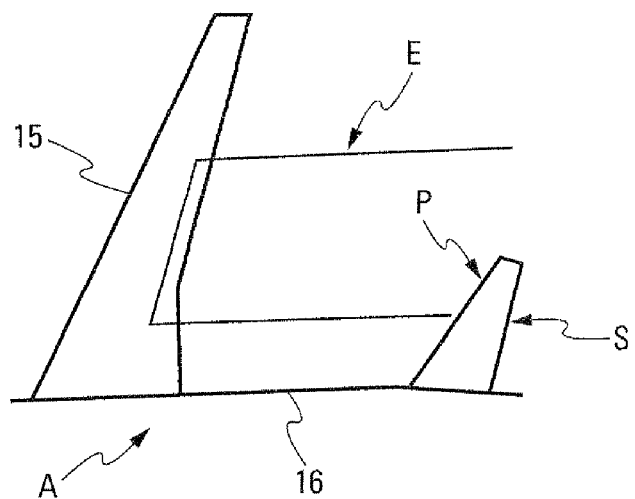
FIG. 2 shows a flow able to generate some buffeting on the structure of an airplane.

In the example on FIG. 2, there is illustrated a stall on a wing 15 of an airplane A (presenting a fuselage 16) and the aerodynamic excitation E resulting therefrom acts on the part P of the elevator unit S, located at the rear of such a stall area.

Figure 3:
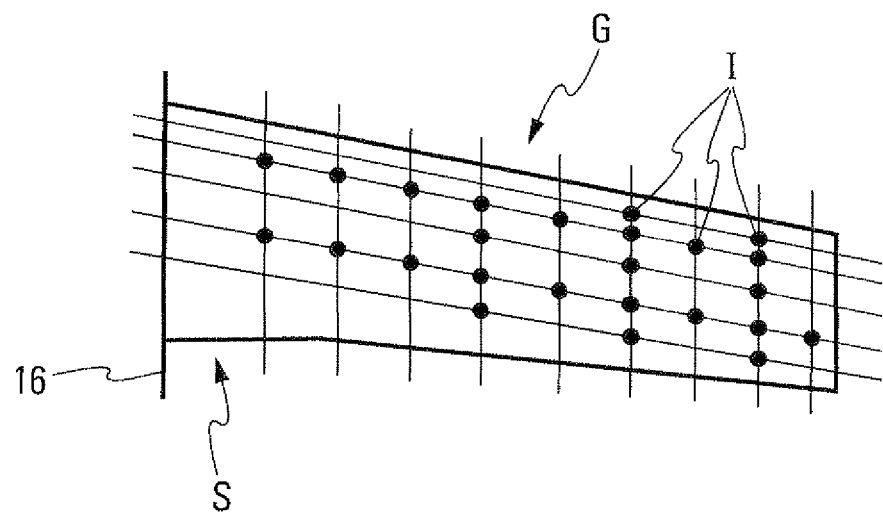
FIG. 3 schematically shows a grid being associated with a particular structure and being used by a device according to this invention.

In the situations being considered in the present invention, modeling the excitation force generates a problem. For determining the aerodynamic forces, the device 1 uses the measurements carried out during trials by means of instationary pressure sensors. However, such procedures require a minimum number of instationary pressure measurements for allowing for the loads to be predicted. Now, because of geometrical, technical and financial limitations, the number of instationary pressure sensors arranged on the model during trials in a blowing unit is too low for obtaining the expected result. Therefore, in order to solve this problem, the present invention contemplates, at the level of the means 5 of the device 1, modeling additional signals. More specifically, such additional pressure signals are determined by said means 5 from an interpolated amplitude of experimental pressure spectra and from a random, although cross-correlated, phase. The interpolation is implemented on a grid G, such as illustrated on FIG. 3, being based on the instrumentation of the trials in a blowing unit.

Said means 5 determine said instationary pressure signals by means of analytical functions illustrating space correlations between different signals. The correlations cor(x,y) are calculated by means of the following equation:

$$cor(x,y)=C(x,y)/\sqrt{C(x,x) \cdot C(y,y)}$$

wherein:
x represents the direction along the chord of the structure S; and
y represents the direction along the span of the structure S.
Moreover, it can be written:

$$C(x, y) = (1/(n-1)) \cdot \sum_{i=1}^{n-1} x(i) \cdot y(i)$$

C(x,y) is equal:
to 1, if the signals are in phase;
to 0, if the signals are in phase quadrature; and
to −1, if the signals are in phase opposition.

The correlations are very significant between sensors being very close one to the other. The correlations in the chord direction, emphasized by a parameter xn, can be represented by an analytical function. Such a correlation function is as follows:

$$corx = \cos(8 \cdot xn) \cdot \exp(-2|xn|)$$

The cosine (cos) represents the phase difference between the pressure signals in the chord direction. The exponential part (exp) illustrates the loss of information when the distance between two sensors increases. The parameter xn is a semi-empirical parameter depending on the Strouhal number n:

$$n = f \cdot L/V$$

In such an equation:
f is the frequency;
L is the characteristic length; and
V is the infinite velocity.

The parameter xn also depends on the geometrical distance dx between the sensors and the size lx of the burble, both in the chord direction.

Such a parameter xn could be expressed by the following equation:

$$xn = (dx/lx) \cdot \sqrt{(n+nO)/(n\max+nO)}$$

wherein:
dx thus represents the distance between two sensors in the chord direction;
lx is thus the size of the burble in the chord direction;
n is the Strouhal number; and
nO and nmax are empirical constants.

An equivalent representation could be implemented in the span direction by means of a parameter yn. In such a case, the analytical function can be defined as follows:

$$cory = \exp(-1.5 \cdot |yn|).$$

In such a case, there is only a loss of information in the span direction. There is no significant phase difference between the pressure signals in the span direction. The chord and the span correlations show a symmetrical behavior. They are independent from the sign of the distance dx.

For modelling the additional pressure signals, first, the positions of the associated sensors should be determined. To do so, a grid G is defined, comprising a signal at each one of the intersections I thereof and being associated to the structure S, as shown on FIG. 3. The number of signals can be increased adding additional sections in the grid G so as to have available sufficient information for obtaining converging forces.

The additional instationary (virtual) pressure signals are defined by an amplitude being interpolated between the instationary experimental pressure signals (measurements) and a random phase following the space correlation functions corx and cory in the chord and in the span directions. Thus, the new pressure signals contain the essential characteristics of the measurements, i.e. the energy level, the frequency distribution, the random character of the phase and the correlation between signals.

The additional instationary pressure signals depend on the flow conditions and, in particular, the Mach number and the Reynolds number. The flight conditions being different from the experimental conditions, the means 5 should convert the pressure signals from the trial conditions in a blowing unit (illustrated by the measurements) into flight conditions, so that the predicted final loads represent real conditions. Using this conversion, the pressure field is then obtained, that should be transmitted to the means 7.

In order to carry out such a conversion, said means 5 can, for example, take into consideration the frequency and the values of the quadratic mean divided by the frequency, and use the following equation:

$$\sqrt{n \cdot F(n)} = \Delta p / (pdyn \cdot \sqrt{\epsilon})$$

wherein:
$\sqrt{n \cdot F(n)}$ is an instationary parameter of the blowing unit;
$\Delta p$ is the quadratic mean of the pressure field according to a band $\Delta f$ of frequencies f;
pdyn is the dynamic pressure; and
$\epsilon = \Delta f/f$.

The pressure field as generated as above mentioned by the means 5 is transmitted to the means 7 so that they can integrate it. In order to do so, said means 7 integrate:
first of all, said pressure field according to the chord of the structure S, on each section of the structure S, so as to obtain a value per section; and
then, such a value per section, according to the span of the structure S, so as to obtain the desired overall stresses and moments, being illustrated by an equation Fexci(t).

It should be noticed that buffeting generates the instationary aerodynamic excitation force Fexci(t) on the structure S of the airplane A. The resulting movement induces an induced force Find(t). The two forces Fexci(t) and Find(t) both act on the structure S and generate buffeting. As the force Fexci(t) is insensitive to the vibrations of the structure S, it is considered as independent from the induced force Find(t). Said induced force Find(t) is taken into consideration by the above described equation (2).

By means of the instationary aerodynamic excitation force Fexci(t), the means 9 calculate the stresses that the structure S should bear, using the following aeroelastic equation (1):

$$[\mu]\cdot\{\ddot{q}\}+[\beta]\cdot\{\dot{q}\}+[\gamma]\cdot\{q\}=pdyn\cdot[FGM(M,k)]\cdot\{q\}+[\Phi]^{T}\cdot\{Fexci\} \quad (1)$$

with $$pdyn\cdot[FGM(M,k)]\cdot\{q\}+[\Phi]^{T}\cdot\{Find\} \quad (2)$$

wherein:
- $[\mu]$ is a une mode mass matrix;
- $[\beta]$ is a mode damping matrix;
- $[\gamma]$ is a mode stiffness matrix;
- $[FGM(M,k)]$ represents the generalized movement forces;
- $[\Phi]$ is a proper mode matrix;
- $\{q\}$ represents the mode coordinates;
- pdyn is the dynamic pressure; and
- T illustrates the transpose.

Said equation (1) thus allowing the means 9 to calculate the stresses (illustrated by the expression $[\gamma]\cdot\{q\}$) that the structure S is to bear comprises:
- an equation illustrating the aerodynamic stresses generated by buffeting: $[\Phi]^{T}\cdot\{Fexci\}$;
- an equation illustrating the induced aerodynamic stresses: $[FGM(M,K)]\cdot\{q\}$;
- an expression illustrating the inertia stresses: $[\mu]\cdot\{\ddot{q}\}$; and
- an equation illustrating the damping stresses: $[\beta]\cdot\{\dot{q}\}$.

During trials in a blowing unit, for a structure S such as an elevator unit being mounted on both sides of the median vertical symmetric plane of the airplane A, only the part located on one side of such a plane is provided with sensors so that the device 1 allows to determine using such means 2, 4, 6, 5, 7 and 9, only the excitation Fexci on one single side of the airplane.

In such a situation, said means 11 are arranged so as to determine the loads to be borne by the whole buffeting structure S, from received information relating to an excitation F1 on one single side.

In the particular case of an elevator unit buffeting, one single or both sides of the elevator unit can be submitted to buffeting. Thus, for determining the most critical cases for such a particular structure S, the means 11 are arranged so as:
- to apply both on the right and on the left the same excitation (symmetrical load): F2=F;
- to scan with a constant phase shift as the most critical case F2=−F1 being equivalent to a 180° phase shift;
- to introduce a time delay ΔT in the signals: F2=F1(t−ΔT); and
- to generate from F1 an uncorrelated signal but with the same frequency contents (F1'): −F2=F1'(t−ΔT).

The aeroelastic analyses enable to calculate the forces at the fixing points 17 and 18 of the elevator unit S at the fuselage 16 so as to be able to calculate the rolling moment Mx. It is possible that both excitations are independent and that they are uncorrelated.

Figure 4:
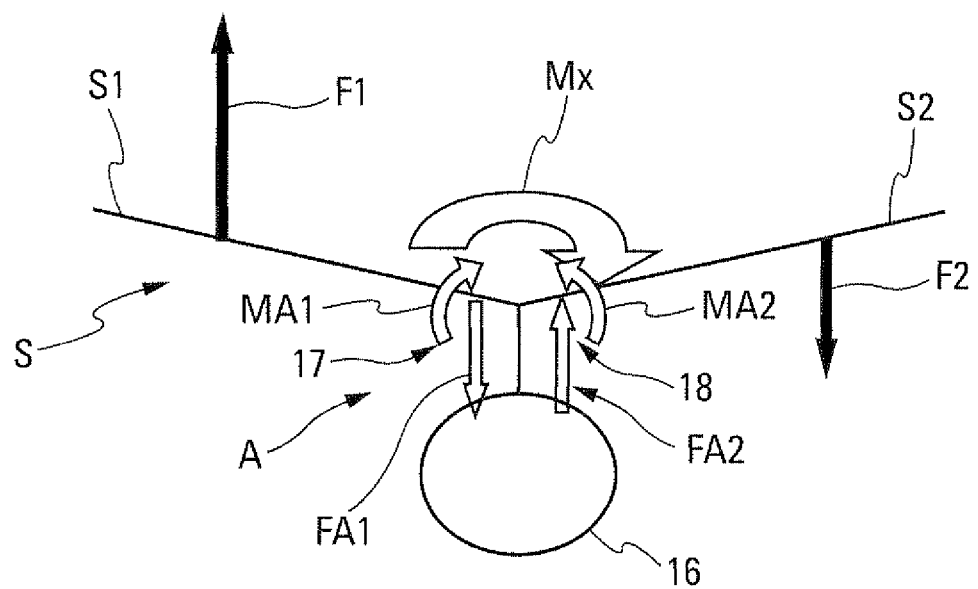
FIG. 4 is a graphic view emphasizing the different stresses and moments being generated at the level of an elevator unit undergoing some buffeting.

As shown on FIG. 4, the elevator unit could be submitted on one side to a force F1 and on the other side to a force F2. Said forces F1 and F2 could be uncorrelated or not (random nature). The means 11 enable to calculate the rolling moment Mx using the following expression:

$$Mx=MA1+FA1\cdot r1+MA2+FA2\cdot r2$$

wherein:
- r represents the distance;
- the index 1 corresponds to a side (S1) and the index 2 to the other side (S2) of the structure S;
- F1 and F2 represent the aerodynamic stresses and the induced stresses applied to the airplane;
- FA2 and FA1 represent the forces to be borne at the level of the roots 17 and 18 of both parts S1 and S2 of the elevator unit S; and
- the moments MA1 and MA2 represent the moments to be borne at said roots 17 and 18.

The invention claimed is:

1. A method for determining critical loads generated by buffeting on a structure (S) of an airplane (A), said method comprising:
   a) conducting trials in a blowing unit on an airplane model, said trials comprising:
      simulating conditions for which some flow burble occurs on at least one part of a surface of the airplane (A); and
      carrying out, for such conditions, measurements using stationary pressure sensors, instationary pressure sensors and accelerometers arranged on said model;
   b) using at least some of such measurements, the flow burble areas are determined on said structure (S) of the airplane (A);
   c) implementing an aerodynamic model for determining, using the measurements from steps a), in the flow burble areas as determined from step b), a pressure field resulting in the structure (S) buffeting;
   d) integrating the determined pressure field so as to obtain the overall stresses and moments generated by buffeting;
   e) calculating, using such overall stresses and moments, the stresses that the structure (S) is to bear, such stresses comprising aerodynamic stresses caused by buffeting, induced aerodynamic stresses, inertia stresses and damping stresses; and
   f) determining the critical loads due to buffeting using the stresses as calculated in step e).

2. A method according to claim 1, wherein in step b), flow burble areas are determined, additionally using data obtained from simulations.

3. A method according to claim 1, wherein in step c), additional instationary pressure signals are determined using an interpolated amplitude of pressure signals as obtained from step a), and a cross-correlated random phase.

4. A method according to claim 3, wherein in step c), said additional instationary pressure signals are determined using analytical functions illustrating space correlations between the signals.

5. A method according to claim 4, wherein said additional instationary pressure signals are defined at the intersections of a predetermined grid (G) being associated with said structure (S).

6. A method according to claim 1, wherein in step c), the additional instationary pressure signals are converted from particular conditions relating to trials in a blowing unit into flight conditions.

7. A method according to claim 1, wherein in step d), first of all, the pressure field is integrated according to the chord of said structure (S), then the result being obtained is integrated according to the span of the structure (S), so as to obtain said overall stresses and moments.

8. A method according to claim 1, wherein in step e), a model of finished elements and an aerodynamic model are used, taking into consideration the effects of the aerodynamics as induced by the structure (S) vibration.

9. A method according to claim 1, wherein, for determining the critical loads generated by some buffeting on a structure representing an elevator unit (S) of the airplane, in step f):

the same excitation is applied both on the right and on the left of the airplane;

a scan is implemented with a constant phase shift; and a time delay is introduced in the signals.

10. A device for determining the critical loads generated by some buffeting on a structure (S) of an airplane (A), said device (1) comprising:

first means (2) for conducting trials in a blowing unit on a model of an airplane, said trials comprising simulating conditions for which some flow burble occurs on at least one part of a surface of the airplane (A), and carrying out, for such conditions, measurements using stationary pressure sensors, instationary pressure sensors and accelerometers being arranged on said model; and second means (4) for determining, using at least some of such measurements, flow burble areas on said structure (S) of the airplane (A);

third means (5) for carrying out an aerodynamic modelling so as to determine, using the measurements as implemented during trials in a blowing unit, in the flow burble areas as determined by said second means (4), a pressure field, generating some buffeting of the structure (S);

fourth means (7) for integrating the thus determined pressure field so as to obtain the overall stresses and moments generated by the buffeting;

fifth means (9) for calculating, by means of such overall stresses and moments, the stresses the structure (S) is to bear, such stresses comprising aerodynamic stresses generated by buffeting, induced aerodynamic stresses, inertia stresses and damping stresses; and sixth means (11) for determining the critical loads generated by buffeting using the stresses as calculated by said fifth means (9).

* * * * *